Patented Jan. 23, 1934

1,944,419

UNITED STATES PATENT OFFICE 1,944,419

PROCESS FOR THE FORMATION OF OLEFINES

Per K. Frolich, Cambridge, Mass., and Benjamin C. Boeckeler, St. Louis, Mo.; said Frolich assignor to Standard Oil Development Company, a corporation of Delaware No Drawing. Application May 2, 1929
Serial No. 360,000

4 Claims. (Cl. 260—170)

The present invention relates to improvements in a process for the production of olefines, and more specifically comprises an improved process for the production of olefines from saturated paraffin hydrocarbons. The process will be fully understood from the following description.

It is well known that the paraffin hydrocarbons decompose under the action of heat, and that olefines are formed therefrom. The process is not a simple one, however, but is the result of several reactions. The following equations show two ways in which decomposition occurs:

(1) $C_nH_{2n+2} \rightarrow C_nH_{2n} + H_2$ and (2) $C_nH_{2n+2} \rightarrow C_{n-x}H_{2n-2x} + C_xH_{2x+2}$ In addition to these reactions others resulting in carbon formation and in polymerization of lower to high boiling products take place.

The present process comprises a method by which the first of the above reactions is allowed to proceed without the second and in this way a large share of olefines corresponding to the paraffin used is formed. In other words, a simple dehydrogenation is obtained without any substantial production of saturated hydrocarbons such as methane.

In the operation of the process a paraffin hydrocarbon, heavier than methane, such as ethane, propane, butane, pentane and the like, or a mixture of such paraffins, is vaporized at low pressure and is passed through a reaction zone in which the temperature is regulated and in which a suitable catalyst is placed.

The temperature of the reaction zone depends somewhat on the particular catalyst, but in general is below 700° C. and above about 450° C. The temperature to some extent depends also on the particular hydrocarbon being treated and is generally higher for lower molecular weight hydrocarbons. The time of reaction also varies with temperature and the particular catalyst. If the time is too short the yield of olefine is small, and if too long carbon formation and polymerization reduce the yield. The space velocity used, in terms of volume of hydrocarbons per minute per volume of reaction space, is advantageously in the neighborhood of 13, although it has been as low as 1.8 and as high as 108 in the terms given.

Metallic catalysts have been found satisfactory, and mixtures of metallic oxides after reduction with methanol, hydrogen, hydrocarbon vapor or otherwise are preferred, although other types of dehydrogenation catalysts may be used. Catalysts containing zinc oxide and another oxide of a metal which has two or more valences have been found to be satisfactory, such as 30 molecular per cent of zinc oxide and 70 molecular per cent of chromium oxide, or other proportions of the same elements, or zinc oxide and molybdenum oxide.

It is also advantageous to dilute the hydrocarbon with other gases such as nitrogen or water vapor or hydrogen which tends to prevent carbon deposition.

As an example of the process, the catalyst is prepared in the following manner—25 cc. of a suspension of $Zn(OH)_2$ containing 0.107 gr. per cc. is added to 38 cc. of a solution of $CrO_3$ containing 0.1645 gr. per cc. All but a trace of the $Zn(OH)_2$ dissolves. 12 cc. of 1/8" pumice stone previously digested in concentrated HCl is then added and the solution evaporated and the solid dried at 100° C. Analysis shows the metals to be in the mol. proportion of 30.2% zinc and 69.8% chromium.

The catalyst is then reduced with pure methanol, gradually increasing the temperature from 80° C. to 250° C. in 45 minutes. The catalyst is then placed in a quartz tube 18" by 1/8" in diameter and wound with resistance wire for electrical heating.

Propane is then passed through the tube at a rate of 9.6 liters per hour, being preheated before entering the reaction tube. In terms of space velocity, the rate of flow is 13.4 volumes of propane vapor per minute per volume of reaction space and the temperature is maintained at about 635° C.

The offtake gas is collected and gives the following analysis:

Propylene_____ 14.3%
Ethylene_____ .2
Hydrogen_____ 26.1
Residue_____ 59.4

The residue is substantially entirely propane. There is some carbon deposition.

In a second experiment similar to the above, using a catalyst of the same composition as in the previous example and the same rate of flow, but with a temperature of 505–530° C. and with nitrogen as a diluent, about 11.7 mol. % of the propane was converted to propylene without the formation of ethylene and with no visible carbon deposition.

The process may be applied as above noted to pure hydrocarbons heavier than methane or to mixtures of hydrocarbons, although in the latter case it is preferable to use closely fractionated cuts. The unchanged hydrocarbon may be recirculated to increase the yield of olefines as will be understood—first separating the olefines, for example by absorption in sulfuric acid or otherwise.

The invention is not to be limited by any theory of the mechanism of the reaction nor by any example given merely by way of illustration, but only by the following claims in which it is desired to claim all novelty inherent in the invention.

We claim:

1. An improved process for the treatment of paraffin hydrocarbons heavier than methane for the production of olefines of the same number of carbon atoms without formation of substantial quantities of lower molecular weight olefines, which comprises passing the hydrocarbons through a reaction zone at a temperature between the approximate limits of 450° and 700° C. in contact with a catalyst, composed of a mixture of zinc oxide and chromium oxide, which has been subjected to reducing conditions before coming in contact with the paraffin hydrocarbons.

2. Process according to claim 1 in which the rate of flow is between the limits of 1.8 and 108 volumes of hydrocarbon per minute per volume of reaction space.

3. An improved process for the treatment of paraffin hydrocarbons heavier than methane for the production of olefines of the same number of carbon atoms without formation of substantial quantities of lower molecular weight olefines, which comprises passing the hydrocarbons through a reaction zone at a temperature between the approximate limits of 450° and 700° C. in contact with a catalyst composed of about 30 mol. per cent of zinc oxide and 70 mol. per cent of chromium oxide.

4. An improved process for the formation of olefines from paraffin hydrocarbons heavier than methane which comprises passing the hydrocarbons over a catalyst comprising about 30 mol. per cent zinc oxide and 70 mol. per cent chromium oxide.

PER K. FROLICH.
BENJAMIN C. BOECKELER.